United States Patent
Grill

(10) Patent No.: US 11,384,296 B2
(45) Date of Patent: Jul. 12, 2022

(54) HYDROISOMERIZATION CATALYST

(71) Applicant: HALDOR TOPSØE A/S, Kgs. Lyngby (DK)

(72) Inventor: Marie Grill, Frederiksberg C (DK)

(73) Assignee: HALDOR TOPSØE A/S, Kgs. Lyngby (DK)

(*) Notice: Subject to any disclaimer, the term of this patent is extended or adjusted under 35 U.S.C. 154(b) by 0 days.

(21) Appl. No.: 16/492,222

(22) PCT Filed: Mar. 13, 2018

(86) PCT No.: PCT/EP2018/056273
§ 371 (c)(1),
(2) Date: Sep. 9, 2019

(87) PCT Pub. No.: WO2018/167081
PCT Pub. Date: Sep. 20, 2018

(65) Prior Publication Data
US 2020/0048565 A1 Feb. 13, 2020

(30) Foreign Application Priority Data
Mar. 14, 2017 (DK) .......................... PA 2017 00178

(51) Int. Cl.
| | | |
|---|---|---|
| *B01J 35/02* | (2006.01) | |
| *C10G 45/64* | (2006.01) | |
| *B01J 29/74* | (2006.01) | |
| *B01J 35/00* | (2006.01) | |
| *B01J 37/02* | (2006.01) | |
| *B01J 37/18* | (2006.01) | |
| *B01J 29/12* | (2006.01) | |
| *B01J 29/22* | (2006.01) | |
| *B01J 29/67* | (2006.01) | |
| *B01J 29/068* | (2006.01) | |
| *B01J 29/44* | (2006.01) | |

(52) U.S. Cl.
CPC ............ *C10G 45/64* (2013.01); *B01J 29/068* (2013.01); *B01J 29/12* (2013.01); *B01J 29/22* (2013.01); *B01J 29/44* (2013.01); *B01J 29/67* (2013.01); *B01J 29/74* (2013.01); *B01J 29/743* (2013.01); *B01J 29/7415* (2013.01); *B01J 29/7461* (2013.01); *B01J 29/7476* (2013.01); *B01J 29/7484* (2013.01); *B01J 29/7492* (2013.01); *B01J 35/006* (2013.01); *B01J 35/0093* (2013.01); *B01J 35/023* (2013.01); *B01J 35/026* (2013.01); *B01J 37/0203* (2013.01); *B01J 37/0236* (2013.01); *B01J 37/18* (2013.01); *B01J 2229/183* (2013.01); *B01J 2229/186* (2013.01); *B01J 2229/34* (2013.01); *B01J 2229/42* (2013.01); *C10G 2300/202* (2013.01); *C10G 2300/301* (2013.01); *C10G 2300/304* (2013.01); *C10G 2300/308* (2013.01); *C10G 2300/70* (2013.01)

(58) Field of Classification Search
CPC .......... B01J 29/068; B01J 29/74; B01J 29/12; B01J 29/22; B01J 29/44; B01J 29/67; B01J 29/7492; B01J 29/7461; B01J 29/7476; B01J 29/7415; B01J 29/743; B01J 29/7484; B01J 37/18; B01J 37/0236; B01J 37/0203; B01J 35/0093; B01J 35/006; B01J 35/023; B01J 35/026; B01J 35/0066; B01J 2229/42; B01J 2229/34; B01J 2229/186; C10G 2300/70; C10G 2300/301; C10G 2300/304; C10G 2300/308
USPC ........ 502/60, 63, 64, 66, 69, 71, 73, 74, 77, 502/78, 79, 62
See application file for complete search history.

(56) References Cited

U.S. PATENT DOCUMENTS

| | | | |
|---|---|---|---|
| 4,683,214 A | 7/1987 | Angevine et al. | |
| 5,157,198 A | 10/1992 | Raatz et al. | |
| 6,362,123 B1 * | 3/2002 | Tsao .................. | B01J 29/12 502/74 |
| 6,984,309 B2 | 1/2006 | Benazzi et al. | |
| 2003/0166452 A1 | 9/2003 | Benazzi et al. | |

(Continued)

FOREIGN PATENT DOCUMENTS

| | | |
|---|---|---|
| EP | 1265705 A1 | 12/2002 |
| EP | 2862627 A2 | 4/2015 |

(Continued)

OTHER PUBLICATIONS

De Graaf, J. et al., "Preparation of Highly Dispersed Pt Particles in Zeolite Y with a Narrow Particle Size Distribution: Characterization by Hydrogen Chemisorption, TEM, EXAFS Spectroscopy, and Particle Modeling", Journal of Catalysis, vol. 203, Issue 2, pp. 307-321, Oct. 2001, XP4432395.

(Continued)

*Primary Examiner* — Elizabeth D Wood
(74) *Attorney, Agent, or Firm* — Buchanan Ingersoll & Rooney P.C.

(57) ABSTRACT

The present disclosure relates to a precursor for a catalytically active material or a catalytically active material comprising platinum, a molecular sieve and a metal oxide support, characterized in at least 80%, 90% or 95% of said platinum being dispersed on said molecular sieve and at least 80%, 90% or 95% of said platinum being dispersed in clusters having a size below 2 nm or 1 nm, as well as a method of producing such materials and process for hydroisomerization involving such materials. The disclosure has the associated benefit of such a catalytically active material being highly active and selective towards hydroisomerization.

12 Claims, No Drawings

(56) References Cited

U.S. PATENT DOCUMENTS

| | | |
|---|---|---|
| 2005/0143610 A1 | 6/2005 | Mitchell et al. |
| 2007/0129247 A1 | 6/2007 | Chigapov et al. |
| 2010/0041544 A1 | 2/2010 | Hu et al. |
| 2010/0323884 A1 | 12/2010 | Roldan et al. |
| 2011/0042267 A1* | 2/2011 | Hayasaka ............ B01J 29/064 208/27 |
| 2011/0100872 A1 | 5/2011 | Burton |
| 2012/0027658 A1 | 2/2012 | Karwacki et al. |
| 2012/0065449 A1 | 3/2012 | Loewenstein et al. |
| 2014/0209506 A1* | 7/2014 | Domokos ............ B01J 29/7049 208/60 |
| 2014/0274664 A1 | 9/2014 | Weigel et al. |
| 2015/0057478 A1* | 2/2015 | Nagayasu ............ C07C 5/2775 585/254 |
| 2015/0112110 A1* | 4/2015 | Lee ..................... C07C 5/2775 585/739 |
| 2015/0126791 A1* | 5/2015 | Kijlstra ................ B01J 29/084 585/653 |
| 2016/0051971 A1* | 2/2016 | Choi .................... B01J 29/7003 502/74 |
| 2016/0059223 A1 | 3/2016 | Nakajima et al. |

FOREIGN PATENT DOCUMENTS

| | | |
|---|---|---|
| EP | 2990111 A1 | 3/2016 |
| JP | H04211023 A | 8/1992 |
| JP | 2002503753 A | 2/2002 |
| JP | 2002534247 A | 10/2002 |
| JP | 2016520419 A | 7/2016 |
| WO | 9941333 A1 | 8/1999 |
| WO | 0040333 A1 | 7/2000 |
| WO | 02088279 A1 | 11/2002 |
| WO | 2014156486 A1 | 10/2014 |
| WO | 2015001404 A1 | 1/2015 |
| WO | 2017112647 A1 | 6/2017 |

OTHER PUBLICATIONS

Aboul-Gheit, A.K. et al.,"Nanosized Platinum-Loaded H-ZSM-5 Zeolite Catalysts for n-Hexane Hydroconversion", Petroleum Science and Technology, vol. 29, Issue 22, Sep. 21, 2011 XP55484729.

Danish Search Report dated Sep. 14, 2017, issued by the Danish Patent and Trademark Office in the corresponding Danish Patent Application No. PA 2017 00178, 7 pages.

International Search Report (PCT/ISA/210) dated Jun. 27, 2018, by the European Patent Office as the International Searching Authority for International Application No. PCT/EP2018/056273.

Kim, J. et al., "n-Heptane hydroisomerization over Pt/MFI zeolite nanosheets: Effects of zeolite crystal thickness and platinum location", Journal of Catalysis, vol. 301, pp. 187-197, May 2013 XP55097752.

Written Opinion (PCT/ISA/237) dated Jun. 27, 2018, by the European Patent Office as the International Searching Authority for International Application No. PCT/EP2018/056273.

Zhang, Q. et al.Study on Pt-structured anodic alumina catalysts for catalytic combustion of toluene: Effects of competitive adsorbents and competitive impregnation methods, Applied Surface Science, vol. 360, Part B, 2016, pp. 1066-1074.

Pakharukova, V. et al."Alumina-supported platinum catalysts: Local atomic structure and catalytic activity for complete methane oxidation", Applied Catalysis A: General, vol. 486, 2014, pp. 12-18.

Russian Search Report dated Nov. 11, 2021, issued in corresponding Russian Patent Application No. 2019132220/04(063456), (3 pages).

Office Action (Notice of Reasons for Refusal) dated Jan. 25, 2022, by the Japanese Patent Office in corresponding Japanese Patent Application No. 2019-550760, and an English Translation of the Office Action. (12 pages).

* cited by examiner

HYDROISOMERIZATION CATALYST

TECHNICAL FIELD

The present invention is directed to a method for producing a catalytically active material and specifically a catalyst for hydroisomerization of a hydrocarbon mixture suitable for use as a diesel fuel, jet fuel, lubricant, or home heating oil as well as a hydroisomerization process employing such a catalyst.

BACKGROUND AND SUMMARY

The feed hydrocarbon mixtures of relevance for the present disclosure may originate either from atmospheric or vacuum fractionation of a hydrocarbon mixture with a wide boiling range. The hydrocarbon mixture may originate from a variety of sources, including mineral oils, renewable oils (including oils of vegetable and/or animal origins), and synthetically manufactured hydrocarbons, like, for example, via the well-known Fischer Tropsch reaction to synthesis gas generated from, for example, biomass and coal gasification, natural gas reforming, coke-oven gas, and other sources, as well as a mixture of hydrocarbons from these sources.

As it is well known to the skilled person, e.g., from the European standard EN 590 for diesel fuels, a hydrocarbon mixture may, depending upon its origin, have satisfactory cold flow properties at any temperature for one specific application, while the cold flow properties may need to be improved for certain other applications, often in connection with seasonal variation of temperature (typically in winter), or the cold flow properties may need improvement throughout the year.

Problematic cold flow properties i.e. crystallization or partial solidification at low temperatures are most commonly related to long (C7+) straight chain n-paraffins, which may be isomerized to form branched isomerized paraffins (i-paraffins), with improved cold flow properties.

Several methods of optimizing cold flow properties are available, and as they all aim at reducing the presence or at least the effect of the wax like n-paraffins these methods are commonly called de-waxing.

Product blending may improve the cold flow properties by dilution of the feedstock with lower boiling streams (for example kerosene) or appropriate additives (depressant of crystal formation) to feedstock oils. Albeit technologically simple, these methods are traditionally expensive.

Products with acceptable cold flow properties may also be obtained by catalytic hydrocracking of feedstocks. This reaction cracks long n-paraffins thereby producing shorter molecules having satisfactory cold flow properties.

Hydrocracking will result in loss of product, due to formation of hydrocarbons boiling outside the desired boiling point range, and large consumption of hydrogen.

A further route to improvement of the cold flow properties of products is catalytic hydroisomerization. Appropriate catalysts are active in promoting hydroisomerization reactions, providing isomers with various degree of branching from the original straight chain paraffins.

Hydroisomerization allows higher yield of the product fraction of interest and a lower consumption of hydrogen compared to hydrocracking. The process requires the presence of hydrogen.

The process of dewaxing or hydroisomerization is carried out in the presence of a catalyst, which in accordance with the present disclosure comprises a noble metal component selected from Group VIII of the Periodic System and being supported on a carrier comprising a metal oxide such as alumina, silica, titania or silica-alumina or combinations of these, as well as a molecular sieve having a topology such as AEI, AEL, AFO, AFX, ATO, BEA, CHA, FAU, FER, MEL, MFI, MOR, MRE, MTT, MWW or TON.

As in most chemical reactions, especially of complex mixtures such as a diesel pool, multiple parallel reactions may occur. These parallel reactions may in the case of dewaxing through hydroisomerization often be hydrocracking reactions having small hydrocarbons as products, which are not suited for being part of a diesel pool, and therefore represent a yield loss, and thus an economical loss as well as a cost due to consumption of hydrogen. Over time, the yield has been optimized especially by optimizing process conditions and the catalyst used.

As used herein the value of a cold flow parameter is represented by a temperature reflecting the viscosity of a hydrocarbon mixture at low temperatures, including the parameters cloud point, pour point, freezing point and cold filter plugging point (CFPP). Common among these parameters is that they define the requirement to low viscosity of diesel under cold conditions as it is also specified in the standard EN 590 specifying requirements to diesel. For most practical purposes the parameters are affected by the same chemical mechanisms, and the terminology "improvement of cold flow properties" or "improvement of any one of these parameters" shall unless stated otherwise be understood as equivalent.

As used herein, i-paraffins or iso-paraffins shall, as understood by the skilled person in the field of refinery technology, be considered as any branched paraffin, contrary to the strict definition of iso-paraffins being paraffins having a single methyl group proximate to carbon chain end.

As used herein in the following, "feedstock" or "feedstock oil" shall comprise any stream, originating from one or more of mineral oils, renewable oils or from a product from Fischer Trapsch synthesis from synthesis gas, with cold flow properties requiring improvement.

A material catalytically active in hydroisomerization shall be understood as a material having significant catalytic activity for hydroisomerization under the conditions used, but as it will be realized by the skilled person, most reactions will show an amount of side reactions, and even where side reactions are comparable in extent or exceeding the desired hydroisomerization reaction the material shall be considered catalytically active in the hydroisomerization, where an amount of hydroisomerization takes place.

As used herein the unit NL/L shall indicate the volume of gas (in normal liters, i.e. liters at 0° C. and 1 bar) per volume of liquid (in liters at 15° C. and 1 bar).

As used herein the term precursor for a catalytically active material shall be understood as a material being convertible to a catalytically active material by an activation process such as reduction.

As used herein, the term topology of a molecular sieve is used in the sense described in the "Atlas of Zeolite Framework Types," Sixth Revised Edition, Elsevier, 2007, and three letter framework type codes are used in accordance herewith.

DETAILED DESCRIPTION

In a broad form the present disclosure relates to a precursor for a catalytically active material or a catalytically active material comprising platinum, a molecular sieve and a metal oxide support, characterized in at least 80%, 90% or 95% of said platinum being dispersed on said molecular sieve and at least 80%, 90% or 95% of said platinum being dispersed in clusters having a size below 1 nm, with the associated benefit of such a catalytically active material being highly active and selective towards dewaxing or hydroisomerization.

In a further embodiment the precursor or the catalytically active material further comprises at least 0.5% carbon with the associated benefit of such a catalytically active material being highly active and selective towards dewaxing or hydroisomerization.

In a further embodiment the precursor or the catalytically active material comprises at least 1% organic additive or compounds derived therefrom, with the associated benefit of such a catalytically active material being highly active and selective towards dewaxing or hydroisomerization.

In a further embodiment said metal oxide support is taken from the group comprising alumina, silica, silica-alumina and titania, with the associated benefit of such a catalytically active material being thermally and mechanically stable.

In a further embodiment said molecular sieve is one or more materials taken from the group having AEI, AEL, AFO, AFX, ATO, BEA, CHA, FAU, FER, MEL, MFI, MOR, MRE, MTT, MWW or TON topology such as EU-2, ZSM-11, ZSM-22, ZSM-23, ZSM-48, SAPO-5, SAPO-11, SAPO-31, SAPO-34, SAPO-41, SSZ-13, SSZ-16, SSZ-39, MCM-22, zeolite Y, ferrierite, mordenite, ZSM-5 or zeolite beta, with the associated benefit of such materials being active in dewaxing or hydroisomerization of linear hydrocarbons.

In a further embodiment said molecular sieve is EU-2, and said molecular sieve has a silica to alumina ratio from 50, 90, 125 or 155 to 165 or 200, with the associated benefit of such a silica to alumina ratio providing a stable molecular sieve with high hydroisomerization activity and selectivity.

A further aspect of the present invention relates to a method for producing a precursor for a catalytically active material involving the steps of
a) Forming a support paste by combining a metal oxide with a molecular sieve
b) Extruding or pelletizing said support paste, forming support particles,
c) Impregnating said support particles by incipient wetness impregnation with a solution of platinum salt comprising an organic additive such as citric acid, lactic acid or formic acid, providing catalyst precursor
d) Drying said catalyst precursor at a temperature of 120° C. to 200° C. in air with the associated benefit of such a process being an increased impregnation depth in the particles and selective impregnation on the molecular sieve.

A further aspect of the present invention relates to a method for producing a catalytically active material from said precursor, by contacting said precursor with a flow of hydrogen at a temperature between 150° C. and 350° C., with the associated benefit of such a process allowing production of said precursor independently from the site of operation of the catalytically active material.

A further aspect of the present invention relates to a process for isomerizing a hydrocarbon involving directing said hydrocarbon to contact a catalytically active material produced according to said method for producing a catalytically active material in the presence of hydrogen under dewaxing conditions with the associated benefit of such a dewaxing process having increased activity, compared to similar dewaxing on catalytically active materials containing the same molecular sieve but having a different platinum distribution and dispersion.

A further embodiment of the present disclosure refers to a catalyst or a catalyst precursor comprising platinum, a molecular sieve having MRE topology, and a metal oxide support being alumina or silica, and optionally further comprising 0.5 wt % carbon and/or 1% organic additive and/or compounds derived from organic additive, wherein at least 95% of the platinum surface area is found in clusters on said molecular sieve, wherein said platinum is dispersed such that at least 80% of the platinum surface area is found in clusters in clusters having a size below 2 nm, with the associated benefit of providing a highly active isomerization catalyst due to molecular sieve of MRE topology being active in isomerization, the platinum being available proximate to the zeolite supporting increased isomerization activity and with the presence of platinum in small clusters providing a high activity.

A further embodiment of the present disclosure refers to a catalyst or a catalyst pre-cursor comprising platinum, a molecular sieve being EU-2 having a silica to alumina ratio from 50 to 200, a metal oxide support being alumina, and optionally further comprising 0.5 wt % carbon and/or 1% organic additive and/or compounds derived from organic additive, wherein said platinum is dispersed such that at least 90% of the platinum surface area is found in clusters on said molecular sieve and at least 80% of the platinum surface area is found in clusters having a size below 2 nm, with the associated benefit of providing a highly active isomerization catalyst due to EU-2 molecular sieve being active in isomerization especially at low silica to alumina ratios, the platinum being available proximate to the zeolite supporting increased isomerization activity and with the presence of platinum in small clusters providing a high activity.

A further embodiment of the present disclosure refers to a catalyst or a catalyst pre-cursor comprising platinum, a molecular sieve being EU-2 having a silica to alumina ratio from 50 to 200, a metal oxide support being alumina, and optionally further comprising 0.5 wt % carbon and/or 1% organic additive and/or compounds derived from organic additive, wherein said platinum is dispersed such that at least 90% of the platinum surface area is found in clusters on said molecular sieve and at least 90% of the platinum surface area is found in clusters having a size below 2 nm, with the associated benefit of providing a highly active isomerization catalyst due to EU-2 molecular sieve being active in isomerization especially at low silica to alumina ratios, the platinum being available proximate to the zeolite supporting increased isomerization activity and with the presence of platinum in small clusters providing a high activity.

A further embodiment of the present disclosure refers to a catalyst or a catalyst pre-cursor comprising platinum, a molecular sieve being EU-2 having a silica to alumina ratio from 90 to 200, A metal oxide support being alumina, and optionally further comprising 0.5 wt % carbon and/or 1% organic additive and/or compounds derived from organic additive, wherein said platinum is dispersed such that at least 90% of the platinum surface area is found in clusters on said molecular sieve and at least 90% of the platinum surface area is found in clusters having a size below 2 nm, with the associated benefit of providing a highly active isomerization catalyst due to EU-2 molecular sieve being active in isomerization especially at low silica to alumina ratios, the platinum being available proximate to the zeolite supporting increased isomerization activity and with the presence of platinum in small clusters providing a high activity.

A further embodiment of the present disclosure refers to a catalyst or a catalyst pre-cursor comprising platinum, a molecular sieve being EU-2 having a silica to alumina ratio from 125 to 200, a metal oxide support being alumina, and optionally further comprising 0.5 wt % carbon and/or 1% organic additive and/or compounds derived from organic additive, wherein said platinum is dispersed such that at least 90% of the platinum surface area is found in clusters on said molecular sieve and at least 90% of the platinum surface area is found in clusters having a size below 2 nm, with the associated benefit of providing a highly active isomerization catalyst due to EU-2 molecular sieve being active in isomerization also at intermediate silica to alumina ratios, the platinum being available proximate to the zeolite supporting increased isomerization activity and with the presence of platinum in small clusters providing a high activity.

A further embodiment of the present disclosure refers to a catalyst or a catalyst pre-cursor comprising platinum, a molecular sieve being ferrierite having a silica to alumina ratio from 50 to 200, a metal oxide support being alumina, and optionally further comprising 0.5 wt % carbon and/or 1% organic additive and/or compounds derived from organic additive, wherein said platinum is dispersed such that at least 90% of the platinum surface area is found in clusters on said molecular sieve and at least 90% of the platinum surface area is found in clusters having a size below 2 nm, with the associated benefit of providing a highly active isomerization catalyst due to ferrierite molecular sieve being active in isomerization especially at low silica to alumina ratios, the platinum being available proximate to the zeolite supporting increased isomerization activity and with the presence of platinum in small clusters providing a high activity.

Materials catalytically active in hydroisomerization are typically particles having a diameter of a few millimeters. The production typically involves the formation of a stable support, followed by impregnation of active metals. The stable support typically comprises a metal oxide as well as a molecular sieve, which may be a zeolite. The stable support is produced with a high porosity, to ensure maximum surface area, and it is typically desired to impregnate active metal over the full volume of the support.

According to the present disclosure it has now been identified that if the impregnation liquor comprises an organic additive, such as citric acid, then the active metal will reach more of the catalyst precursor, instead of merely impregnating a shell of the catalyst precursor and in addition the active metal will be selectively deposited on the molecular sieve.

Without being bound by a single theory, it is believed that the organic additive in the impregnation liquor interacts with the support surface, blocking the noble metal from depositing on the metal oxide. As a result, the noble metal can be distributed throughout the full volume of the catalyst precursor, and is deposited merely solely on the molecular sieve.

The effect has been demonstrated for the impregnation of a carrier comprising alumina and EU-2 zeolite, with an impregnation liquor comprising platinum and citric acid. The effect observed for EU-2 is also expected for other molecular sieves. The effect is also expected for other organic additives, including lactic acid and formic acid, as these will also interact with the support surface in the catalyst precursor. Finally, the effect is also considered to be applicable to other metal oxide supports, such as silica and titania, which are also used in the composition of catalytically active material.

EXAMPLES

Two examples of catalytically active material were synthesized. Catalyst 1 was produced according to the present invention and catalyst 2 was produced according to the prior art, in accordance with U.S. Pat. No. 6,984,309.

Example 1

Catalyst 1:
A commercial EU-2 zeolite with a silica to alumina ratio (SAR) of 155 was mixed with an alumina gel that is peptized by nitric acid and alumina powder, in a ratio to give a final composition of the extrudates on a dry basis of 65 wt % zeolite and 35 wt % alumina. The paste that is thus obtained is run through a die plate that has cylindrical openings with a diameter of 1.86 mm. The extrudates are then dried for one night at 120° C. and then calcined at 500° C. under air for 2 hours. Onto this substrate is deposited by incipient wetness impregnation an aqueous solution of citric acid and Pt $(NH_3)_4^{2+}$, $2HCO_3^-$, such that the content of platinum deposited on the substrate is ultimately 0.5% by weight after decomposition at 600° C., the citric acid concentration being 0.6 M. The extrudates are then dried under air at 150° C. This preparation produces a fully impregnated catalyst for which the Pt is located on the EU-2 zeolite.

Catalyst 2:
A commercial EU-2 zeolite with a silica to alumina ratio (SAR) of 155 was mixed with an alumina gel that is peptized by nitric acid and alumina powder, in a ratio to give a final composition of the extrudates on a dry basis of 65 wt % zeolite and 35 wt % alumina. The paste that is thus obtained is run through a die plate that has cylindrical openings with a diameter of 1.86 mm. The extrudates are then dried for one night at 120° C. and then calcined at 500° C. under air for 2 hours. Onto this substrate is deposited by incipient wetness impregnation an aqueous solution of ammonia and Pt $(NH_3)_4^{2+}$, $2HCO_3^-$, such that the content of platinum deposited on the substrate is ultimately 0.5% by weight after decomposition at 600° C., the ammonia concentration being 0.15 M. The extrudates are then decomposed under air at 310° C. This preparation produces a shell impregnated catalyst for which the Pt is located both on the alumina and the EU-2 zeolite.

Catalysts 1 and 2 were analyzed by TEM and SEM, and the results are reported in Table 1. It can be seen that Catalyst 1 produced in accordance with the present disclosure is characterized by distribution of platinum in the full volume of the extrudates (no shell impregnation), absence of platinum on the alumina, and that the cluster size of noble metal is below 1 nm, whereas Catalyst 2 produced in accordance with the prior art has significantly larger clusters; up to 15 nm, the platinum is distributed in a shell layer close to the external surface of the extrudates, and the platinum is found on the alumina and on the zeolite. In addition, Catalyst 1 comprises 2% carbon, which is assumed to be in the form of citric acid or compounds derived therefrom.

Example 2

A hydro-deoxygenated corn oil was used as feed for hydroisomerization over the example catalysts. The characteristics of the feed are shown in Table 2. The feed was directed to contact Catalysts 1 and 2 under a pressure of 50 barg, a temperature of 300 and 320° C., a LHSV of 2 h$^{-1}$, and a hydrogen to oil ratio of 500 NL/L. Key characteristics of the products are shown in Table 3.

Table 3 shows the effect of these differences in platinum distribution on performance of Catalyst 1 and Catalyst 2. It is seen that for similar conditions Catalyst 1 has a higher dewaxing activity, reflected by the higher cloud point improvement (CPI) at iso-temperature.

TABLE 1

|  | Catalyst 1 | Catalyst 2 |
|---|---|---|
| Impregnation | Uniform | <200 μm shell |
| Platinum cluster size | <1 nm | <15 nm |
| Platinum on alumina | No | Yes |
| Platinum on zeolite | Yes | Yes |
| Carbon | 2% | <0.1% |

TABLE 2

| Specific gravity | 60/60° F. | 0.8039 |
|---|---|---|
| Nitrogen | wt ppm | 0.4 |
| Sulfur | wt ppm | 9 |
| Cloud point | ° C. | 24 |
| Pour point | ° C. | 21 |
| Aromatics |  |  |
| Monoaromatics | wt % | 3.56 |
| Diaromatics | wt % | 0.11 |
| Tri+-aromatics | wt % | <0.05 |
| Simulated distillation |  |  |
| IBP | ° C. | 126.0 |
| 5 wt % | ° C. | 272.0 |
| 10 wt % | ° C. | 288.4 |
| 30 wt % | ° C. | 315.2 |
| 50 wt % | ° C. | 320.4 |
| 70 wt % | ° C. | 322.2 |
| 90 wt % | ° C. | 447.0 |
| 95 wt % | ° C. | 478.6 |
| FBP | ° C. | 566.0 |

TABLE 3

|  |  | Catalyst 1 | | Catalyst 2 | |
|---|---|---|---|---|---|
|  |  | 300° C. | 320° C. | 300° C. | 320° C. |
| CPI | ° C. | 17.2 | 43.2 | 9.6 | 31.8 |
| H$_2$ Consumption | NL/L | 6 | 12 | 7 | 13 |

The invention claimed is:

1. A material comprising:
   platinum,
   a molecular sieve,
   a metal oxide support selected from the group consisting of alumina, silica, silica-alumina and titania, and
   at least 0.5 wt % carbon,
   wherein the material is formed by incipient wetness impregnation of an unactivated material with a solution of a platinum salt, the unactivated material comprising said molecular sieve and said metal oxide support, wherein the unactivated material is formed by extruding or pelletizing a support paste formed from said molecular sieve and said metal oxide support,
   wherein at least 80% of said platinum of the material being dispersed on said molecular sieve and at least 80% of said platinum of the material being dispersed in clusters having a size below 2 nm, and
   wherein the material is a precursor for a catalytically active material, or wherein the material is a catalytically active material formed by activating the precursor material by reduction to produce the catalytically active material which catalyzes a hydroisomerization reaction,
   wherein said molecular sieve is EU-2, and wherein said molecular sieve has a silica to alumina ratio from 50 to 200.

2. The material according to claim 1, wherein the platinum of the material has a surface area, wherein the platinum of the material is distributed such that at least 80% of the surface area of the platinum of the material is dispersed on said molecular sieve, and further wherein at least 80% of the surface area of the platinum of the material is found in clusters having a size below 2 nm.

3. The material according to claim 1, wherein the platinum of the material has a mass, wherein the platinum of the material is distributed such that at least 80% of the mass of the platinum of the material is dispersed on said molecular sieve, and further wherein at least 80% of the mass of the platinum of the material is found in clusters having a size below 2 nm.

4. The material according to claim 1, comprising at least 1 wt % organic additive or compounds derived therefrom.

5. The material according to claim 1, wherein the material is the precursor for a catalytically active material.

6. A catalytically active material prepared by contacting the precursor for a catalytically active material of claim 5 with a flow of hydrogen at a temperature between 150° C. and 350° C.

7. The material according to claim 2, comprising at least 1 wt % organic additive or compounds derived therefrom.

8. The material according to claim 2, wherein the material is the precursor for a catalytically active material.

9. A catalytically active material prepared by contacting the precursor for a catalytically active material of claim 8 with a flow of hydrogen at a temperature between 150° C. and 350° C.

10. The material according to claim 3, comprising at least 1 wt % organic additive or compounds derived therefrom.

11. The material according to claim 3, wherein the material is the precursor for a catalytically active material.

12. A catalytically active material prepared by contacting the precursor for a catalytically active material of claim 11 with a flow of hydrogen at a temperature between 150° C. and 350° C.

* * * * *